United States Patent [19]
Sampath

[11] Patent Number: 5,252,201
[45] Date of Patent: Oct. 12, 1993

[54] FRACTIONATING PROCESS AND FRACTIONATOR

[75] Inventor: Vijay R. Sampath, Bellingham, Wash.

[73] Assignee: Atlantic Richfield Company, Los Angeles, Calif.

[21] Appl. No.: 744,550

[22] Filed: Aug. 13, 1991

[51] Int. Cl.$^5$ .............................. C10G 7/00; B01D 3/16
[52] U.S. Cl. .................................. 208/355; 208/347; 208/350; 208/358; 196/100; 202/161
[58] Field of Search .................. 196/100; 202/161; 203/94, 98; 208/355, 358, 347, 350

[56] References Cited

U.S. PATENT DOCUMENTS 2,853,439  9/1958  Ernst, Jr. ............................. 208/355
3,210,271  10/1965  Byerly et al. ....................... 208/355

OTHER PUBLICATIONS

Van Winkle, *Distillation*, p. 195 data unknown.
Watkins, R. N., "Petroleum Refinery Distillation", Gulf Publishing Co., pp. 6–8, 1970 (month unknown).

*Primary Examiner*—Theodore Morris
*Assistant Examiner*—Walter D. Griffin
*Attorney, Agent, or Firm*—Tom F. Pruitt

[57] ABSTRACT

An improved fractionating process is provided wherein a liquid stream is withdrawn from the separation zone of the fractionator, is cooled and is recycled to the fractionator at a location below the location of withdrawal of the liquid stream. An improved fractionator is provided which comprises a withdrawal point from which a liquid stream is withdrawn, a cooler to cool the withdrawn stream and a means for recycling the withdrawn stream to a point below the withdrawal point.

10 Claims, 4 Drawing Sheets

TOTAL DRAW TRAY

PARTIAL DRAW TRAY

FRACTIONATING PROCESS AND FRACTIONATOR

BACKGROUND OF THE INVENTION

1. Field of the Invention

In one aspect, this invention relates to a fractionating process which produces a distillate having improved product quality. In another aspect, this invention relates to a method to increase fractionator capacity. In still another aspect, this invention relates to a method of increasing heat removal from a fractionator. In an additional aspect, this invention relates to an improved fractionator.

2. Background

Complex fractionation is used in petroleum refining to separate fractionator feed mixtures, such as crude oil, reactor effluent, coker gas oils, and other heavy oil streams, into various distillate, intermediate product and residual streams. The overhead distillate and column intermediate sidestreams typically include a wide-boiling range of materials and the residual liquid from the column bottoms is generally a relatively high boiling residuum.

Heavy oil fractionating processes generally employ somewhat different fractionator designs and processing methods than light hydrocarbon fractionation, although there are many process and equipment similarities. For instance, reboilers are generally used in light hydrocarbon fractionation; however, reboilers are not generally used in crude distillation because the feed is commonly heated to its maximum allowable temperature in a crude furnace prior to being fed to the crude tower. Heavy oil fractionator design and operation thus entail special considerations.

Common to both heavy oil and light hydrocarbon fractionation is a fractionating tower which contains a number of trays where ascending vapor in the tower is contacted with liquid cascading down the tower, which contact causes heat and mass interchange on each tray. Each tray comprises a downcomer to direct liquid from the tray to the tray below, a weir to maintain a liquid level on the tray, perforations to permit vapor passage upward through the tray, and a contacting means such as bubble caps, tray valves, or the like to enhance liquid-vapor contact. The vapor becomes progressively lighter as it rises through the tower and the liquid becomes progressively heavier as it passes down the tower. The vapor leaving the tower is totally or partially condensed and generally at least a portion of the condensed stream is returned back to the top tray of the tower as reflux and a portion is recovered as distillate product.

It is generally desirable to produce a distillate product with a relatively higher concentration of more volatile, lower boiling components of the feed. Such distillate is obtained by increasing reflux and the number of trays in the fractionator. The concentration of light components in the distillate is increased as the amount of reflux returned to the fractionator is increased as measured by the reflux ratio. The reflux ratio is indicated either (i) as the liquid-to-vapor ratio which is the molal rate at which liquid flows through the column divided by the molal rate at which vapor flows through the column or (ii) as the liquid-to-distillate ratio which is molal rate at which reflux is returned to the column divided by the molal rate at which distillate is withdrawn from the column.

At a given feed rate, distillate rate and bottoms product rate, the separation in the fractionator is improved as the reflux rate to the top tray is increased; however, condenser duty increases and furnace and/or reboiler duty increases as the reflux rate is increased. Also, as the reflux rate is increased, the diameter of the fractionating column must be increased in order to accommodate large vapor and liquid loads in the column. Thus as a practical and economic matter, as reflux to the top tray is increased, both the cost of the construction and the cost of operation of the fractionating column increase.

An alternative method for generating column reflux that is widely practiced in crude and other heavy oil fractionators is called pumparound heat removal or pumparound reflux. Although ample column reflux could be achieved by reflux to the top tray of the fractionator, pumparound reflux provides for heat removal in addition to the overhead condenser and permits improved thermal efficiency and reductions in column diameter and related construction and operating costs. In pumparound reflux, a "partial draw tray" or a "total draw tray" arrangement may be utilized. Partial draw trays are commonly utilized in crude towers and total draw trays are commonly utilized in the wash oil sections of vacuum towers, coker fractionators and other heavier oil fractionators.

In a typical equipment arrangement for pumparound reflux utilizing a "partial draw tray", as such term is used in the specification and claims, part of the liquid on the draw tray is permitted to flow through the draw tray downcomer to the tray below and part of the draw tray liquid is withdrawn from the draw tray and the withdrawn stream is routed to a pump and the pump discharge is separated into two portions. One portion is withdrawn as a side product. The second portion, the pumpup, is cooled, often by heat exchange to preheat the feed to the fractionator, and the cooled pumpup is recycled to the tower to a return tray which is usually one or two trays above the draw tray.

In a typical equipment arrangement for pumparound reflux utilizing a "total draw tray", as such term is used in the specification and claims, the fractionator comprises a draw tray which has a sealed downcomer or has no downcomer or weir or other means to pass liquid to the tray below and reflux to the tray below the draw tray must be supplied externally; however, as with other, non-draw, trays, the draw tray comprises perforations to permit vapor flow upward through the draw tray from the tray below the draw tray, and further comprises contact means to enhance liquid-vapor contact, such as bubble caps, valves or other contactors. Typically, the fractionator interior walls immediately above the draw tray provide the boundary against which liquid level builds on the draw tray. In a typical application of pumparound reflux utilizing a total draw tray, all or part of the liquid retained on the draw tray is withdrawn from the column and the withdrawn stream is routed to a pump and the pump discharge is separated into three portions. One portion is withdrawn as a side product. The second portion, the pumpup, is cooled, often by heat exchange to preheat the feed to the fractionator. The cooled pumpup is recycled to the tower to a return tray which is usually one or two trays above the draw tray. The third portion, the pumpdown, is recycled to the column below the draw tray.

Pumparound reflux reduces column liquid-vapor flow and reduces column diameter and related capital investment and operating costs; however, pumparound reflux has a capacity disadvantage in that the three pumparound zone trays, including the draw tray, the return tray, and the tray intermediate between the draw and return trays provide the separation efficiency only of one theoretical tray for fractionation purposes since the pumparound zone where the liquid from the draw tray is recycled to the return tray is a zone of constant composition and mass transfer is penalized, and capacity and operating efficiency of the fractionator are thereby impacted.

In addition, often in order to maximize the amount of separation zone heat removal, the rate of liquid pumpup to the tower is increased to an amount at which flooding of the tower occurs. When the rate of liquid flows down the column, which liquid flows include the liquid load added by the pumpup stream, are increased in any one tray section or zone comprising several trays, limits are reached wherein the downcomers fill with liquid and a condition of liquid flooding occurs. A flooded tray zone, which may include two or more flooded trays, gives a separation equivalent to one theoretical plate and column separation efficiency is thus reduced.

It is desirable to have an improved fractionating process providing for increased heat removal from the fractionator and a fractionating column which has increased capacity.

SUMMARY OF THE INVENTION

I have discovered that by cooling the pumpdown from a draw tray, the pumpdown flow rate can be significantly reduced. I have also found that cooling of the pumpdown provides a means to shift heat removal burden from the pumpup section of the pumparound circuit, which reduces liquid load on the pumpup return section of the tower and reduces associated flooding problems. The reduction of pumpdown flow rate is advantageous in that replacement of the pump can be avoided at increased rates. In addition, increasing the pump discharge capacity to obtain increased rates can increase the pump discharge or shut-in pressure to a pressure above the design pressure of associated piping, flanges, heat exchangers, and valves in the pumparound circuit. The term "shut-in pressure" means the pump discharge pressure at zero flow. Increases in pumparound loop pressures can require expensive modification to or replacement of heat exchangers, piping and the like.

In accordance with one embodiment of this invention, a fractionating process is provided for separating a feed mixture into a distillate product fraction, a residual liquid product fraction and a separation zone product fraction. The fractionating process comprises a fractionating column comprising a bottoms zone, a separation zone and an overhead zone, and the separation zone comprises a number of trays, including a draw tray. The fractionating process preferably comprises withdrawing from the separation zone a draw liquid from the draw tray, separating the draw liquid into a first portion and a second portion, recovering the first portion of the draw liquid as separation zone product, cooling the second portion of the draw liquid to form a cool draw, separating the cool draw in a first cool part and a second cool part, recycling at least a portion of the first cool part to the fractionating column at a point above the draw tray, and recycling at least a portion of the second cool part to the fractionating column at a point below the draw tray.

In another embodiment of this invention, a fractionating process is provided for separating a feed mixture into a distillate product fraction, a residual liquid product fraction and a separation zone product fraction in a fractionating column comprising a bottoms zone, a separation zone and an overhead zone, wherein the separation zone comprises a draw tray, and the fractionating process comprises withdrawing from the separation zone a draw liquid from the draw tray, separating the draw liquid into a first portion, a second portion and a third portion, recovering the first portion of the draw liquid as separation zone product, cooling the second portion of the draw liquid to form a first cool draw, cooling the third portion of the draw liquid to form a second cool draw, recycling at least a portion of the first cool draw to the fractionating column at a point above the draw tray, and recycling at least a portion of the second cool draw to the fractionating column at a point below the draw tray.

In still another embodiment of this invention, an improved fractionating process is provided wherein such process employs a fractionator which comprises a partial draw tray receiving tray liquid wherein the partial draw tray comprises a weir means adapted to retain a part of the tray liquid on the partial draw tray and a downcomer means adapted to pass a part of the tray liquid downward from the partial draw tray. The fractionating process comprises withdrawing an amount of the tray liquid from the partial draw tray to form an amount of withdrawn liquid, separating the withdrawn liquid into a first portion and a second portion, cooling the second portion to form a cooled second portion, and recycling the cooled second portion to the fractionator at a location above the partial draw tray, and the improvement comprises sealing the downcomer means to reduce passage of the tray liquid downward from the partial draw tray, withdrawing an increased amount of the tray liquid to form an increased amount of withdrawn liquid, and recycling a portion of the cooled withdrawn liquid to the fractionator at a location below the partial draw tray. In one variation of this embodiment, the first portion is recovered as product.

In a preferred embodiment of this invention, another improved fractionating process is provided wherein such process employs a fractionator which comprises a partial draw tray receiving tray liquid wherein the partial draw tray comprises a weir means adapted to retain a part of the tray liquid on the partial draw tray and a downcomer means adapted to pass a part of the tray liquid downward from the partial draw tray. The fractionating process comprises withdrawing an amount of the tray liquid from the partial draw tray to form an amount of withdrawn liquid, separating the withdrawn liquid into a first portion and a second portion, cooling the second portion to form a cooled second portion, and recycling the cooled second portion to the fractionator at a location above the partial draw tray, and the improvement comprises sealing the downcomer means to reduce passage of the tray liquid downward from the partial draw tray, withdrawing an increased amount of the tray liquid to form an increased amount of withdrawn liquid, separating out a third portion of the withdrawn liquid in addition to the first portion and the second portion, cooling the third portion to form a cooled third portion, and recycling the cooled third portion to the fractionator at a location below the partial draw tray. In one variation of this embodiment, the first portion is recovered as product.

In still another embodiment of this invention, a fractionating process employs a fractionator which comprises a total draw tray, wherein the total draw tray is adapted to retain tray liquid on the total draw tray. The fractionating process comprises withdrawing the tray liquid from the total draw tray to form a withdrawn liquid, separating the withdrawn liquid into a first portion, a second portion and a third portion, recovering the first portion as product, cooling the second portion to form a cooled second portion, recycling the cooled second portion to the fractionator at a location above the total draw tray, and recycling the third portion to the fractionator a location below the total draw tray, and the improvement comprises cooling the third portion before recycling to the fractionator.

In another embodiment of this invention, a fractionator for separating a feed mixture into a distillate product fraction, a residual liquid product fraction and a separation zone product fraction is provided. Preferably, the fractionator comprises a means for feeding the feed mixture to the fractionator, a means for introducing heat energy to cause vaporization of the feed mixture to form ascending vapor in the fractionator, a means for removing heat energy from the ascending vapor to condense the ascending vapor to form descending liquid reflux in the fractionator, a tray means for contacting the ascending vapor with the descending liquid reflux, a draw tray, a means for retaining an amount of the descending liquid reflux on the draw tray, a means for withdrawing a portion of the descending liquid reflux from the draw tray to form a withdrawn liquid, a cooler means to form a cooled portion of the withdrawn liquid, and a recycle means to recycle at least a part of the cooled portion of the withdrawn liquid to the fractionator below the draw tray.

DESCRIPTION OF PREFERRED EMBODIMENTS

Figure 1:
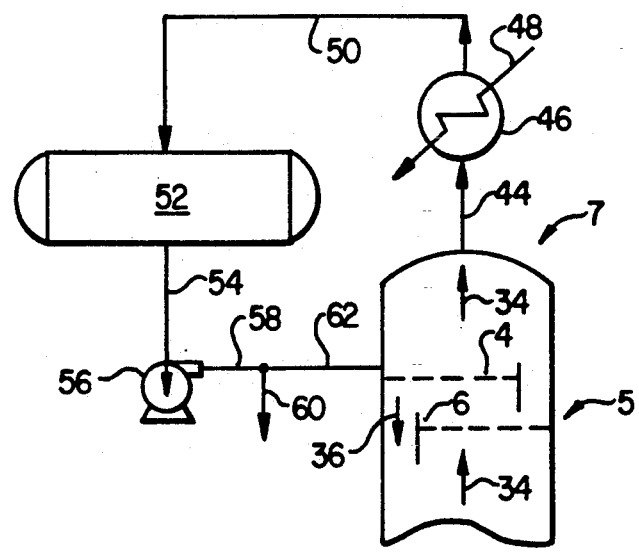
FIG. 1 is a schematic diagram of a prior art fractionator with a partial draw tray pumparound circuit.
Figure 1:
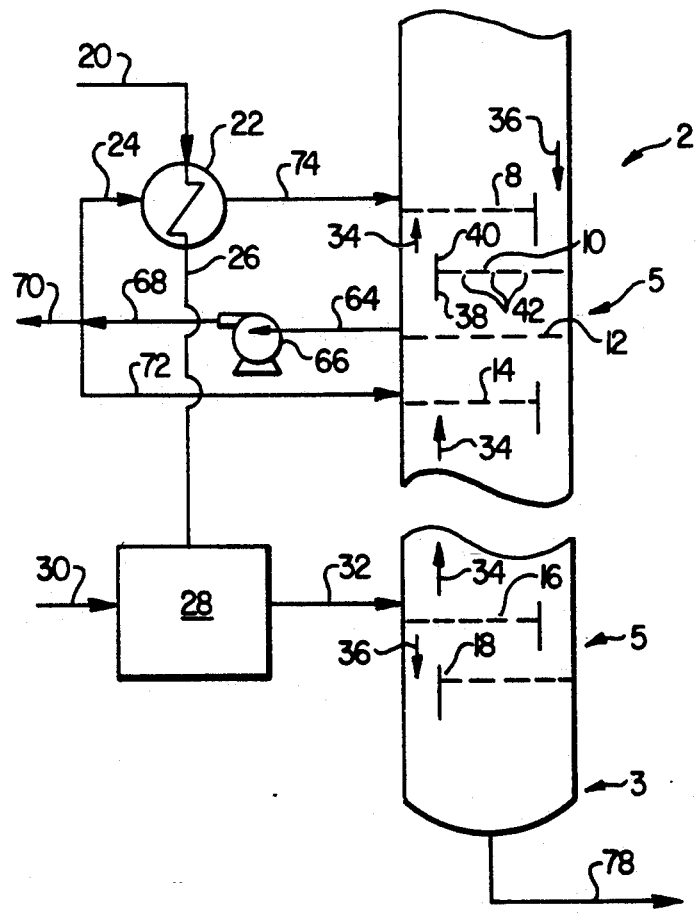

In FIG. 1, a prior art fractionating tower is shown generally as 2 and contains a number of trays 4, 6, 8, 10, 12, 14, 16 and 18. The fractionator 2 comprises a bottoms zone 3, a separation zone 5 and an overhead zone 7. The separation zone 5 is so marked in FIG. 1 to indicate separation occurring at column 2 trays 4 through 18, although the fractionator 2 is drawn in discrete segments. From the bottom zone 3 below the last tray 18 is withdrawn the non-vaporized residual liquid product stream 78. The separation zone 5 typically comprises trays 4 through 18, but can comprise other separation media such as packing to provide separation stages. In the separation zone 5, liquid reflux 36 passes through each tray 4 through 18 and a certain portion of liquid 36 is retained on each tray to provide an arrangement for the ascending vapor 34 to pass through the liquid 36 and make contact with the liquid 36. A reduced portion of the liquid 36 also passes through the total draw tray 12. Feed mixture 20 is passed in contact with heat exchanger 22 where it is heated by stream 24 to form hot feed 26 by heat input means such as furnace 28 having an energy input source 30 to produce a hot feed to the fractionator 32 to the fractionator 2. The heat energy input means 28, such as a feed furnace, may partially, or may completely, vaporize the feed 20 and provides ascending vapor 34 flow up through the separation zone 5 of the column 2. In the fractionator 2, ascending vapor 34 is contacted with liquid cascading down the tower 36. Each tray 4, 6, 8, 10, 14, 16 and 18, except for draw tray 12, each comprise a downcomer and a weir. Using tray 10 as an example, each such tray comprises a downcomer 38 which directs liquid from such tray to the tray below, which is in this example tray 12 and a weir 40 to maintain a liquid level on the tray 10. Each tray comprises perforations, shown as 42 on tray 10. The perforations permit vapor 34 to pass upward through each tray. Contacting means (not shown), such as bubble caps, tray valves or the like, are generally positioned over and/or adjacent perforations 42 to enhance liquid 36 to vapor 34 contact. The vapor 34 becomes progressively lighter as it rises through the tower 2, and the liquid 36 becomes progressively heavier as it passes down the tower 2. Vapor 34, leaving the tower 2, passes via conduit 44 to a condenser means 46 which has cooling media, such as cooling water or cooling air 48 to provide heat exchange to cool vapor 34 and 44 and totally or partially condense the vapor in conduit 50 which is directed to a cumulator 52. A heat energy removal means 48, such as a condenser, fin-fan cooler or other cooling means, cools and liquifies at least a portion of the vapor 34 which has ascended to the overhead zone 7. A portion of the liquified material 58 is returned as reflux to the overhead zone 7 of the column 2 and portion of the liquified material 58 is withdrawn as distillate product 60. Accumulated, condensed liquid is directed via conduit 54 through pump means 56 and conduit 58 and is either recovered as distillate product 60 or is refluxed via conduit 62 to the top tray 4 of the column 2.

Tray 12 is a total draw tray having no downcomer or having a sealed downcomer, a trapout pan or a draw trough to minimize the passage of descending liquid 36 to tray, below, 14. Reflux to tray 14 must be supplied externally. Draw tray 12 comprises perforations 42, as shown by example at tray 10, to permit vapor flow 34 upward through the draw tray 12 from tray 14, below. Tray 12 is adapted to maintain a liquid level (not shown) on the draw tray 12 and comprises bubble caps, valves or other contact means to enhance liquid-36-to-vapor-34 contact as do all other trays. All or part of the liquid (not shown) of draw tray 12 is withdrawn via conduit 64 and is pumped by pump means 66 via conduit 68 where it is separated into three portions 70, 24 and 72. The first portion 70 is withdrawn as side product. The second portion 24 is cooled by exchanger 22 by heat exchange with cool feedstream 20 or by alternate cooling media (not shown) to form a cool pumpup 74 which is recycled to the tower 2 to the return tray 8 which is above the draw tray 12. The third portion 72, the pumpdown, is recycled to the column 2 below the draw tray 12.

Figure 2:
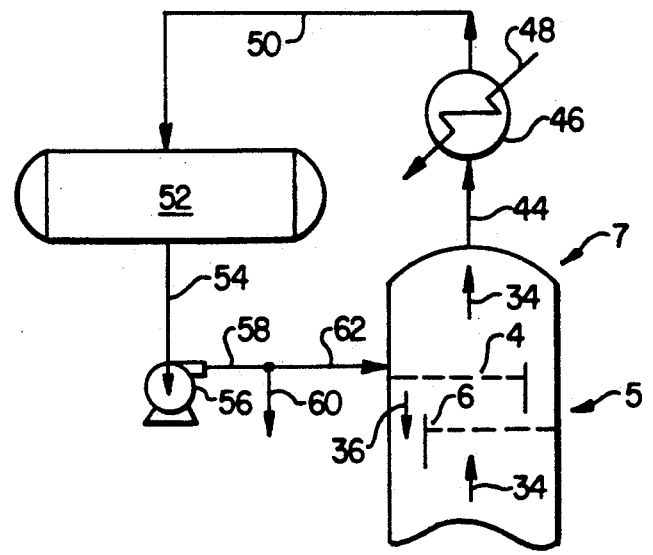
FIG. 2 is a schematic representation of a prior art fractionator comprising a total draw section.
Figure 2:
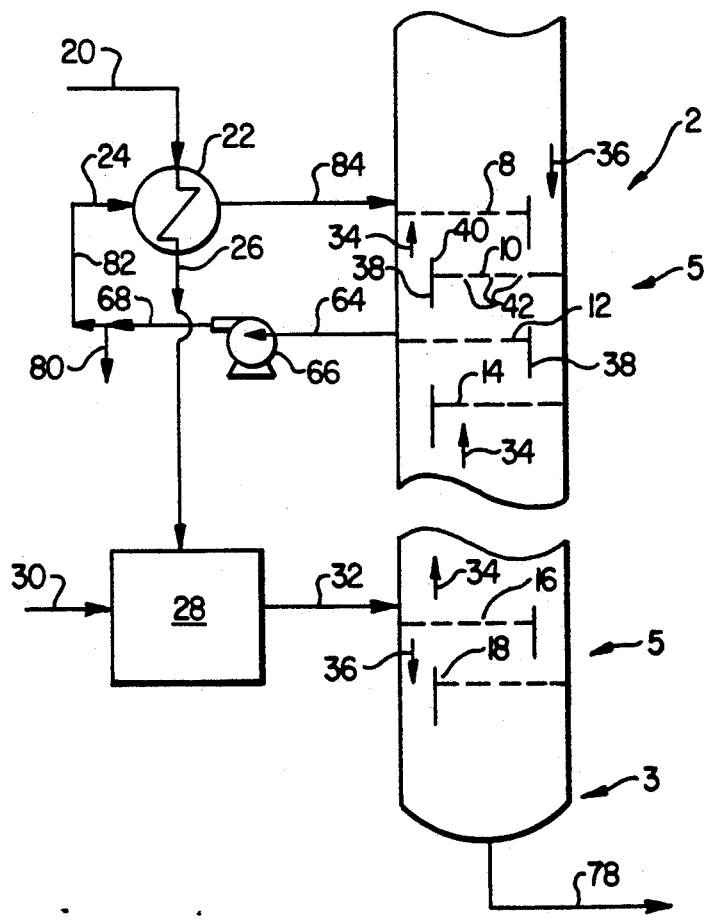

FIG. 2 shows a prior art fractionator comprising a partial draw tray pumparound circuit. Certain numbers in FIG. 1 are used in FIG. 2, and as used, have the same meaning as assigned in the foregoing description of FIG. 1. Part of the liquid (not shown) from the draw tray 12 is permitted to flow through the draw tray 12 downcomer 38 to tray 14, below. Part of the draw tray 12 liquid (not shown) is withdrawn from the draw tray 12 via conduit 64 and is directed to pump 66, and the pump 66 discharge 68 is separated into two portions 80 and 82. Portion 80 is preferably withdrawn as side product, and the second portion 82, the pumpup, is cooled by heat exchange 22 with feedstream 20 to form cooled pumpup 84 which is recycled to the column 2 to tray 8, above the draw tray 12. In other variations of this embodiment, no stream 80 is withdrawn as there is no desire for a side product.

Figure 3:
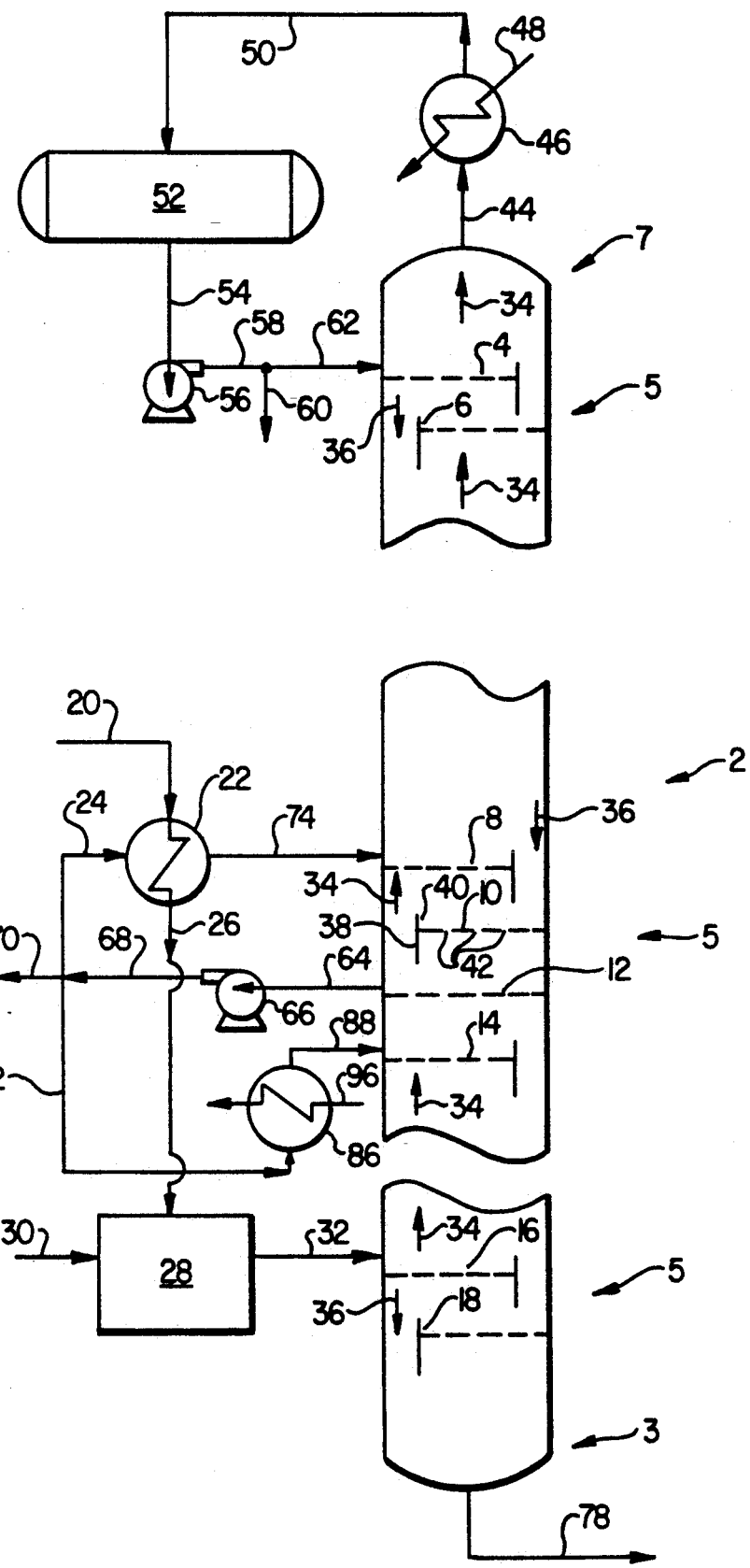
FIG. 3 is a schematic representation of one variation of one embodiment of a fractionating process of this invention.

FIG. 3 shows one variation of one embodiment of a fractionating process of this invention. Certain numbers used in FIGS. 1 and 2 are used in FIG. 3, and as used, have the same meaning as assigned in the foregoing description of FIGS. 1 and 2. Draw liquid 64, as drawn from the draw tray 12, is passed via pump means 66 through conduit 68 where it is separated into a first portion 70, a second portion 24 and a third portion 72. The first portion 70 is withdrawn as product. The second portion 24 is cooled via heat exchanger 22 by passing in heat exchange with stream 20 to form a cooled first draw 74. At least a portion of the first cooled draw 74 is recycled to the fractionating column 2 at tray 8, which is a point above draw tray 12. The third portion 72 of the draw liquid 64 and 68 is cooled via cooler 86 via cooling media 96 to form a second cooled draw 88. At least a portion of the second cooled draw 88 is recycled to the fractionating column 2 at tray 14 which is a point below the draw tray 12.

Figure 4:
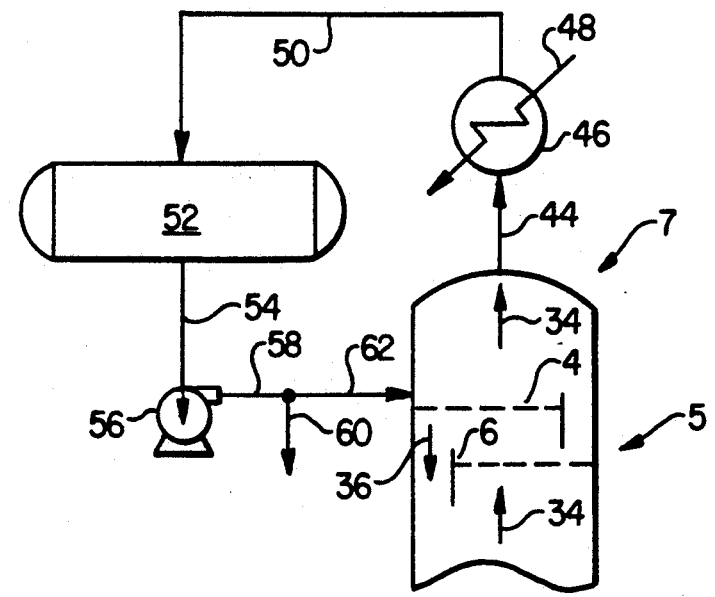
FIG. 4 is a schematic representation of another embodiment of a fractionating process of this invention.
Figure 4:
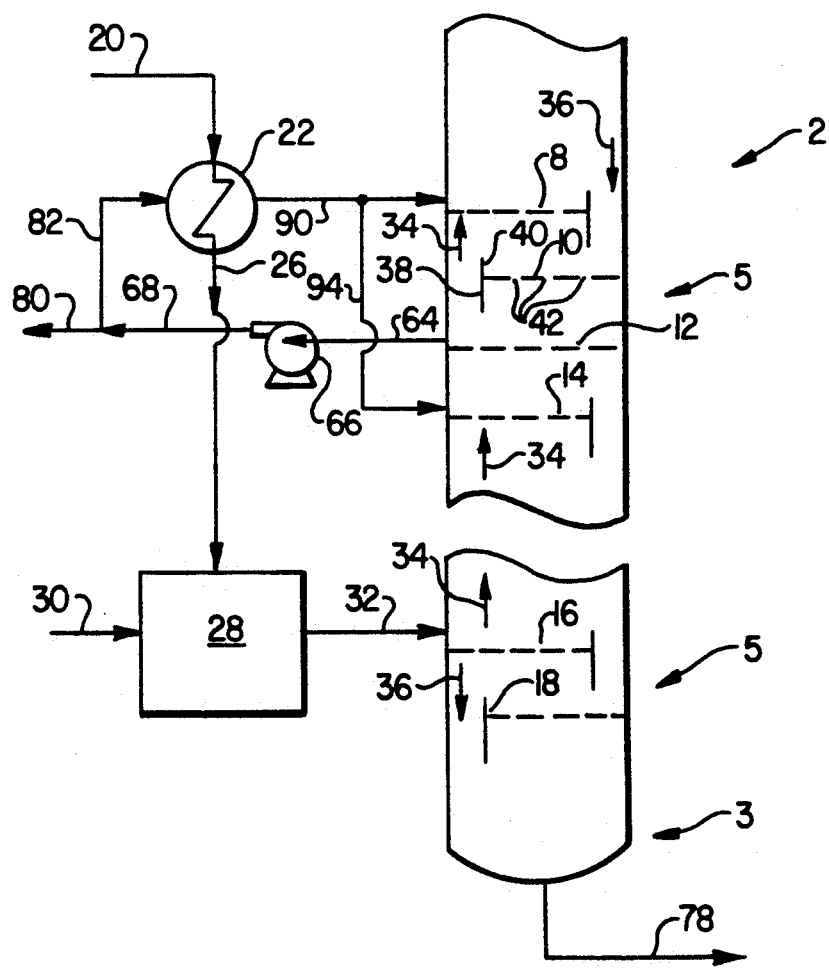

FIG. 4 shows a schematic diagram of another variation of another embodiment of this invention. Certain numbers in FIGS. 1, 2 and 3 are used in FIG. 4, and as used, have the same meaning assigned as the foregoing description of FIGS. 1, 2 and 3. The draw liquid 64 is withdrawn from draw tray 12 and is passed via pump 66 and conduit 68 where it is separated into a first portion 80 and a second portion 82. The first portion 80 of the draw liquid 64 and 68 is recovered as product. The second portion 82 of the draw liquid 64 and 68 is cooled to form a cooled draw 90. The cooled draw 90 is separated into a first cooled part 92 and a second cooled part 94. At least a portion of the first cooled part 92 is recycled to the fractionating column 2 at tray 8 which is a point above the draw tray 12. At least a portion of the second cooled part 94 is recycled to the fractionating column 2 at tray 14 which is a point below draw tray 12.

Variations in the foregoing invention may be made without departing from the spirit and scope thereof.

What is claimed is:

1. A fractionating process for separating a feed mixture into a distillate product fraction, a residual liquid product fraction and a separation zone product fraction in a fractionating column comprising a bottoms zone, a separation zone and an overhead zone, wherein said separation zone comprises a draw tray, said process comprising:
    a. withdrawing from said separation zone a draw liquid from said draw tray;
    b. separating said draw liquid into a first portion and a second portion;
    c. cooling said second portion of said draw liquid to form a cool draw;
    d. separating said cool draw into a first cool part and a second cool part;
    e. recycling at least a portion of said first cool part to said fractionating column at a point above said draw tray; and
    f. recycling at least a portion of said second cool part to said fractionating column at a point below said draw tray.

2. A process in accordance with claim 1 wherein said first portion of said draw liquid is recovered as separation zone product.

3. A fractionating process for separating a feed mixture into a distillate product fraction, a residual liquid product fraction and a separation zone product fraction in a fractionating column comprising a bottoms zone, a separation zone and an overhead zone, wherein said separation zone comprises a draw tray, said process comprising:
    a. withdrawing from said separation zone a draw liquid from said draw tray;
    b. separating said draw liquid into a first portion, a second portion and a third portion;
    c. cooling said second portion of said draw liquid to form a first cool draw;
    d. cooling said third portion of said draw liquid to form a second cool draw;
    e. recycling at least a portion of said first cool draw to said fractionating column at a point above said draw tray; and
    f. recycling at least a portion of said second cool draw to said fractionating column at a point below said draw tray.

4. A process in accordance with claim 3 wherein said first portion of said draw liquid is recovered as separation zone product.

5. In a fractionating process employing a fractionator which comprises a partial draw tray receiving tray liquid wherein said partial draw tray comprises a weir means adapted to retain a part of said tray liquid on said partial draw tray and a downcomer means adapted to pass a part of said tray liquid downward from said partial draw tray, said process comprising (a) withdrawing an amount of said tray liquid from said partial draw tray to form an amount of withdrawn liquid; (b) separating said withdrawn liquid into a first portion and a second portion; (c) recovering said first portion as product; (d) cooling said second portion to form a cooler second portion; and (e) recycling said cooled second portion to said fractionator at a location above said partial draw tray, the improvement comprising:
    i. sealing said downcomer means to reduce passage of said tray liquid downward from said partial draw tray;
    ii. withdrawing an increased amount of said tray liquid to form an increased amount of withdrawn liquid; and
    iii. separating said first portion into a first part and a second part and recovering said first part as product and cooling said second part to form a cool second part and recycling said cool second part to said fractionator at a location below said partial draw tray.

6. In a fractionating process employing a fractionator which comprises a partial draw tray receiving tray liquid wherein said partial draw tray comprises a weir means adapted to retain a part of said tray liquid on said partial draw tray and a downcomer means adapted to pass a part of said tray liquid downward from said partial draw tray, said process comprising (a) withdrawing an amount of said tray liquid from said partial draw tray to form an amount of withdrawn liquid; (b) separating said withdrawn liquid into a first portion and a second portion; (c) recovering said first portion as product; (d)

cooling said second portion to form a cooled second portion; and (e) recycling said cooled second portion to said fractionator at a location above said partial draw tray, the improvement comprising:

i. sealing said downcomer means to reduce passage of said tray liquid downward from said partial draw tray;

ii. withdrawing an increased amount of said tray liquid to form an increased amount of withdrawn liquid;

iii. separating out a third portion of said withdrawn liquid in addition to said first portion and said second portion;

iv. cooling said third portion to form a cooled third portion; and v. recycling said cooled third portion to said fractionator at a location below said partial draw tray.

7. In a fractionating process employing a fractionator which comprises a total draw tray, wherein said total draw tray is adapted to retain tray liquid on said total draw tray, said process comprising (a) withdrawing said tray liquid from said total draw tray to form a withdrawn liquid; (b) separating said withdrawn liquid into a first portion, a second portion and a third portion; (c) recovering said first portion as product; (d) cooling said second portion to form a cooled second portion; (e) recycling said cooled second portion to said fractionator at a location above said total draw tray; and (f) recycling said third portion to said fractionator at a location below said total draw tray; the improvement comprising cooling said third portion before recycling to said fractionator.

8. A fractionator for separating a feed mixture into a distillate product fraction, a residual liquid product fraction and a separation zone product fraction, comprising:

a. a means for feeding said feed mixture to said fractionator;

b. a means for introducing heat energy to cause vaporization of said feed mixture to form ascending vapor in said fractionator;

c. a means for removing heat energy from said ascending vapor to condense said ascending vapor to form descending liquid reflux in said fractionator;

d. a tray means for contacting said ascending vapor with said descending liquid reflux;

e. a draw tray;

f. means for retaining an amount of said descending liquid reflux on said draw tray;

g. means for withdrawing a portion of said descending liquid reflux from said draw tray to form a withdrawn liquid;

h. cooler means to form a cooled portion of said withdrawn liquid; and i. recycle means to recycle at least a part of said cooled portion of said withdrawn liquid to said fractionator below said draw tray and to recycle at least a part of said cooled portion of said withdrawn liquid to said fractionator above said draw tray.

9. A fractionator in accordance with claim 8 wherein said means for introducing heat energy is a furnace which heats said feed mixture external to said fractionator.

10. A fractionator in accordance with claim 8 wherein said draw tray is sealed to minimize flow of descending liquid reflux from said draw tray.

* * * * *